US011869687B2

(12) United States Patent
Nakashima et al.

(10) Patent No.: US 11,869,687 B2
(45) Date of Patent: Jan. 9, 2024

(54) COIL COMPONENT

(71) Applicant: Murata Manufacturing Co., Ltd., Kyoto-fu (JP)

(72) Inventors: Haruki Nakashima, Nagaokakyo (JP); Ryuta Uematsu, Nagaokakyo (JP); Yuki Kanbe, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 302 days.

(21) Appl. No.: 17/464,451

(22) Filed: Sep. 1, 2021

(65) Prior Publication Data

US 2022/0102053 A1 Mar. 31, 2022

(30) Foreign Application Priority Data

Sep. 25, 2020 (JP) ................................ 2020-161361

(51) Int. Cl.
*H01F 27/26* (2006.01)
*H01F 27/28* (2006.01)

(52) U.S. Cl.
CPC ......... *H01F 27/26* (2013.01); *H01F 27/2823* (2013.01)

(58) Field of Classification Search
CPC .... H01F 27/26; H01F 27/2823; H01F 27/263; H01F 17/045; H01F 27/266; H01F 27/24
See application file for complete search history.

(56) References Cited

U.S. PATENT DOCUMENTS

| | | | | |
|---|---|---|---|---|
| 6,965,289 B2 * | 11/2005 | Toi | H01F 27/36 336/200 |
| 2018/0286554 A1 * | 10/2018 | Kojima | H01F 17/045 |
| 2019/0088400 A1 * | 3/2019 | Kanbe | H01F 27/263 |
| 2019/0156990 A1 * | 5/2019 | Igarashi | H01F 27/263 |
| 2020/0105451 A1 * | 4/2020 | Horie | H01F 27/266 |

FOREIGN PATENT DOCUMENTS

| | | |
|---|---|---|
| JP | 2014099587 A * | 5/2014 |
| JP | 2019-050317 A | 3/2019 |
| JP | 2019-135759 A | 8/2019 |
| JP | 2020-102559 A | 7/2020 |

* cited by examiner

*Primary Examiner* — Tuyen T Nguyen
(74) *Attorney, Agent, or Firm* — Studebaker & Brackett PC

(57) ABSTRACT

A coil component includes a core including a winding core portion and a pair of flange portions provided at both ends of the winding core portion, electrode portions provided in the flange portions, a wire wound around the winding core portion, and a magnetic plate fixed to the flange portions. The magnetic plate includes an annular first planar portion, a second planar portion that is located inside the inner circumference of the first planar portion and has a step between the first and the second planar portions, and a connection surface portion connecting the inner circumference of the first planar portion to the outer circumference of the second planar portion. The connection surface portion is configured by annularly disposing at least three slopes inclined with respect to the direction orthogonal to the first planar portion and has chamfered portions each being disposed between adjacent slopes.

20 Claims, 8 Drawing Sheets

COIL COMPONENT

CROSS-REFERENCE TO RELATED APPLICATION

This application claims benefit of priority to Japanese Patent Application No. 2020-161361 filed Sep. 25, 2020, the entire content of which is incorporated herein by reference.

BACKGROUND

Technical Field

The present disclosure relates to a coil component.

Background Art

There is a known coil component described in Japanese Unexamined Patent Application Publication No. 2019-135759. This coil component includes a core having a winding core portion and a pair of flange portions provided at both ends of the winding core portion, electrode portions provided in the pair of flange portions, respectively, a wire which is wound around the winding core portion and is electrically connected to the electrode portions, and a magnetic plate fixed to the pair of flange portions so as to straddle the pair of flange portions.

The magnetic plate has a first main surface facing the flange portions of the core. The outer periphery of the first main surface is provided with a storage portion having a shape depressed along the circumferential direction. An adhesive for bonding the magnetic plate and the flange portions to each other is stored in the storage portion.

SUMMARY

It can be seen that, when a known coil component as described above is actually manufactured and used, the quality thereof may degrade. Specifically, when a magnetic plate having a concave storage portion is manufactured and used, cracks and chips are likely to be generated in the storage portion of the magnetic plate. As described above, defects are likely to occur in the magnetic plate and the quality of the coil component degrades.

Accordingly, the present disclosure provides a coil component for which quality can be ensured.

A coil component according to an aspect of the present disclosure includes a core including a winding core portion and a pair of flange portions provided at both ends of the winding core portion; electrode portions provided in the pair of flange portions, respectively; a wire wound around the winding core portion, with both ends of the wire being electrically connected to the electrode portions; and a magnetic plate fixed to the pair of flange portions so as to straddle the pair of flange portions. The magnetic plate includes an annular first planar portion; a second planar portion that is located inside an inner circumference of the first planar portion as seen in a direction orthogonal to the first planar portion and has a step between the first planar portion and the second planar portion; and a connection surface portion that connects the inner circumference of the first planar portion and an outer circumference of the second planar portion to each other. The connection surface portion is configured by annularly disposing at least three slopes inclined with respect to the direction orthogonal to the first planar portion, and the connection surface portion has chamfered portions each being disposed between adjacent slopes of the at least three slopes.

Here, the chamfered portion is, for example, a convex curved surface, a concave curved surface, or a C surface. In other words, the chamfered portion has no ridge line or has a plurality of ridge lines, and the chamfered portion does not consist of one ridge line, that is, the chamfered portion is not a side.

According to the aspect described above, since the connection surface portion has the chamfered portion between adjacent slopes, cracks and chips in the connection surface portion can be suppressed. In addition, since the connection surface portion is configured by annularly disposing at least three slopes inclined with respect to the direction orthogonal to the first planar portion, the connection surface portion is inclined with respect to the direction orthogonal to the first planar portion. Accordingly, when the magnetic plate is molded by a mold, the mold is easily filled with the material of the magnetic plate and the magnetic plate can be easily removed from the mold, whereby the occurrence of defects in the magnetic plate can be suppressed. Accordingly, the quality of the coil component can be ensured.

In a coil component according to an embodiment, preferably, the magnetic plate has a first main surface facing the core, and a second main surface disposed on an opposite side of the first main surface. The first planar portion, the second planar portion, and the connection surface portion are provided on each of the first main surface and the second main surface.

According to the embodiment described above, the first main surface and the second main surface of the magnetic plate do not need to be distinguished from each other and the magnetic plate can be easily attached to the flange portions of the core.

In a coil component according to an embodiment, preferably, the magnetic plate has a first main surface facing the core, and a second main surface disposed on an opposite side of the first main surface. The first planar portion, the second planar portion, and the connection surface portion are provided on the first main surface among the first main surface and the second main surface.

According to the embodiment described above, the magnetic plate can be manufactured with less processing.

In a coil component according to an embodiment, preferably, the second planar portion is present at a position higher than the first planar portion.

Here, being present at a position higher than the first planar portion means being present at a position farther from the center of the magnetic plate than the first planar portion in the direction orthogonal to the first planar portion.

According to the embodiment described above, when the magnetic plate is attached to the core with the second planar portion of the magnetic plate in contact with the flange portion of the core, the magnetic efficiency can be controlled by control of the adhesion of the magnetic plate to the core. In addition, since a convex portion that projects from the first planar portion is formed by the second planar portion and the connection surface portion, the thickness of the magnetic plate can be increased to improve the strength of the magnetic plate.

In a coil component according to an embodiment, preferably, the second planar portion is present at a position lower than the first planar portion.

Here, being present at a position lower than the first planar portion means being present at a position closer to the center of the magnetic plate than the first planar portion in the direction orthogonal to the first planar portion.

According to the embodiment described above, when the magnetic plate is attached to the core with the second planar portion of the magnetic plate in contact with the flange portion of the core, the magnetic efficiency can be controlled by control of the adhesion of the magnetic plate to the core. In addition, since a concave portion recessed from the first planar portion is formed by the second planar portion and the connection surface portion, the core can be inserted into the concave portion of the magnetic plate to reduce the height of the coil component.

In a coil component according to an embodiment, preferably, an outer circumference of the first planar portion has a rectangular shape.

Here, the rectangular shape includes not only a rectangular shape with sharp corners, but also substantially a rectangular shape with R-shaped corners.

According to the embodiment described above, the magnetic plate can correspond to the shape of the core to improve the magnetic efficiency.

In a coil component according to an embodiment, preferably, a corner of the outer circumference of the first planar portion has an R-shape.

According to the embodiment described above, cracks and chips at a corner of the outer circumference of the first planar portion can be suppressed.

In a coil component according to an embodiment, preferably, the outer circumference of the second planar portion has a rectangular shape.

According to the embodiment described above, the magnetic plate can correspond to the shape of the core to improve the magnetic efficiency.

In a coil component according to an embodiment, preferably, a corner of the outer circumference of the second planar portion has an R-shape.

According to the embodiment described above, cracks and chips at a corner of the outer circumference of the second planar portion can be suppressed.

In a coil component according to an embodiment, preferably, a shape of the second planar portion includes a convex shape.

Here, the convex shape is a shape that projects away from the center of the magnetic plate in the direction orthogonal to the first planar portion.

According to the embodiment described above, when the magnetic plate is attached to the core with the second planar portion of the magnetic plate in contact with the flange portion of the core, the magnetic efficiency can be controlled by control of the adhesion of the magnetic plate to the core. In addition, the thickness of the magnetic plate can be increased to improve the strength of the magnetic plate.

In a coil component according to an embodiment, preferably, the second planar portion has a flat shape.

According to the embodiment described above, when the magnetic plate is attached to the core with the second planar portion of the magnetic plate in contact with the flange portion of the core, the magnetic efficiency can be controlled by control of the adhesion of the magnetic plate to the core.

In a coil component according to an embodiment, preferably, a shape of the second planar portion includes a concave shape.

Here, the concave shape is a shape that is depressed so as to approach the center of the magnetic plate in the direction orthogonal to the first planar portion.

According to the embodiment described above, when the magnetic plate is attached to the core with the second planar portion of the magnetic plate in contact with the flange portion of the core, the magnetic efficiency can be controlled by control of the adhesion of the magnetic plate to the core. In addition, the core can be inserted into the concave portion of the second planar portion to reduce the height of the coil component.

In a coil component according to an embodiment, preferably, an inclination angle of the slopes with respect to the direction orthogonal to the first planar portion is not less than 20°.

According to the embodiment described above, cracks and chips in the connection surface portion can be further suppressed and the occurrence of defects in the magnetic plate can be further suppressed.

In a coil component according to an embodiment, preferably, the inclination angle is not less than 50°.

According to the embodiment described above, cracks and chips in the connection surface portion can be further suppressed and the occurrence of defects in the magnetic plate can be further suppressed.

In a coil component according to an embodiment, preferably, a part of the second planar portion of the magnetic plate overlaps with a part of the flange portion as seen in the direction orthogonal to the first planar portion of the magnetic plate, and a part of the second planar portion is in contact with a part of the flange portion.

According to the embodiment described above, the magnetic plate can be attached to the core with the second planar portion of the magnetic plate in contact with the flange portion of the core.

In a coil component according to an embodiment, preferably, the winding core portion is surrounded by the outer circumference of the second planar portion as seen in the direction orthogonal to the first planar portion.

According to the embodiment described above, since the contact area between the flange portion and the second planar portion can be increased, the fixing strength of the magnetic plate to the core can be improved and the magnetic efficiency can be improved. In addition, since the winding core portion is located inside the outer circumference of the second planar portion, the magnetic path length from the winding core portion to the magnetic plate can be reduced and the magnetic efficiency can be improved.

In a coil component according to an embodiment, preferably, the coil component has a groove partitioned by the first planar portion, the connection surface portion, and a facing surface of the flange portion, the facing surface facing the first planar portion and the connection surface portion, and at least a part of an adhesive for bonding the magnetic plate and the core to each other is present in the groove.

According to the embodiment described above, the groove can be used as an adhesive reservoir to suppress an increase in the outer shape of the coil component due to the protrusion of the adhesive.

In a coil component according to an embodiment, preferably, a portion of the flange portion in contact with the second planar portion has a convex shape that projects toward the second planar portion.

According to the embodiment described above, the magnetic efficiency can be controlled by control of the adhesion of the magnetic plate to the core.

According to the coil component of one aspect of the present disclosure, the quality of the coil component can be ensured by reducing the occurrence of defects in the magnetic plate.

Other features, elements, characteristics and advantages of the present disclosure will become more apparent from the following detailed description of preferred embodiments of the present disclosure with reference to the attached drawings.

DETAILED DESCRIPTION

Coil components according to aspects of the present disclosure will be described in detail using illustrated embodiments. It should be noted that some of the drawings are schematic and may not reflect the actual dimensions and ratios.

First Embodiment

Figure 1:
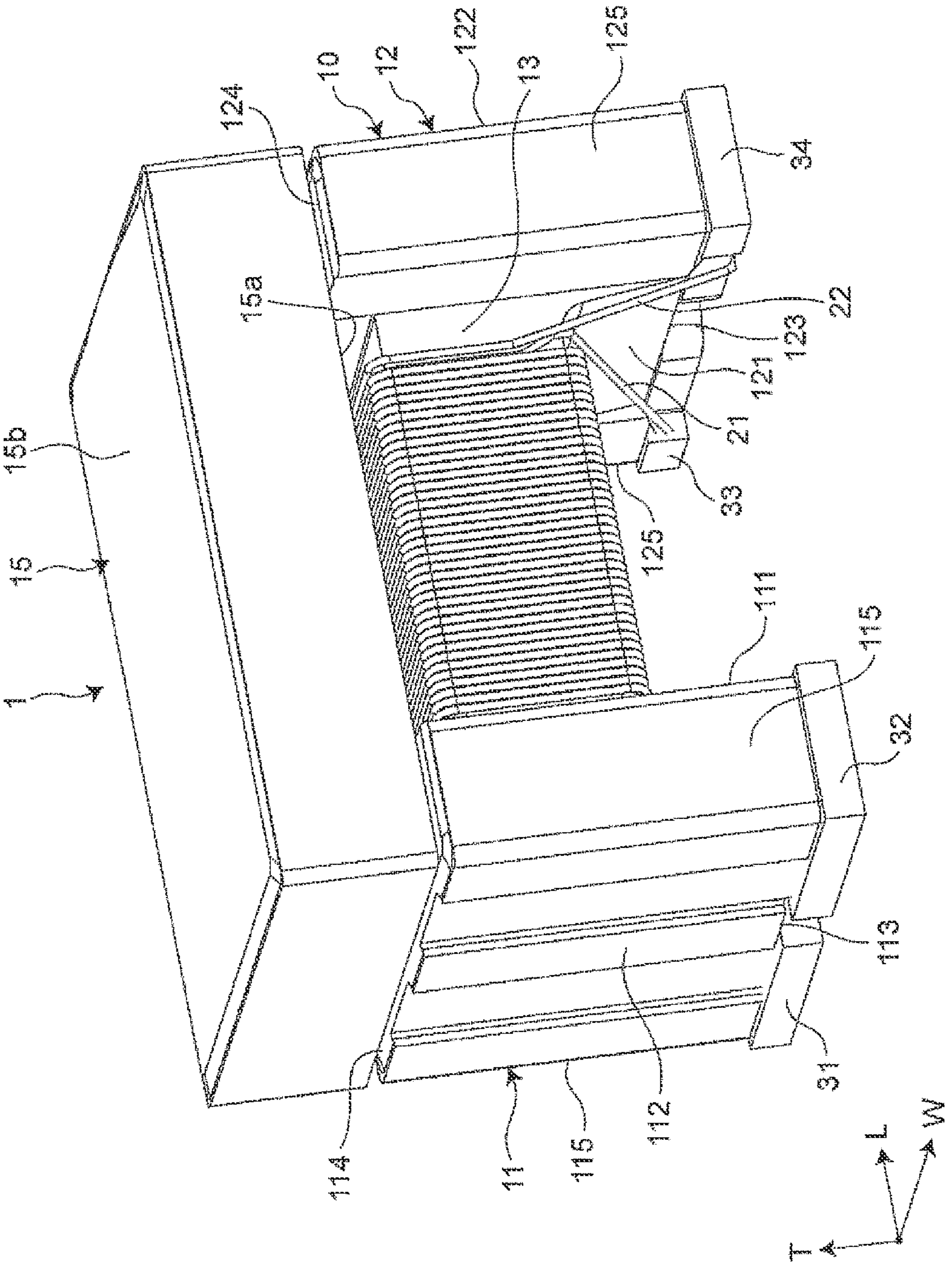
FIG. 1 is a perspective view of a coil component according to a first embodiment as seen from above.
Figure 2:
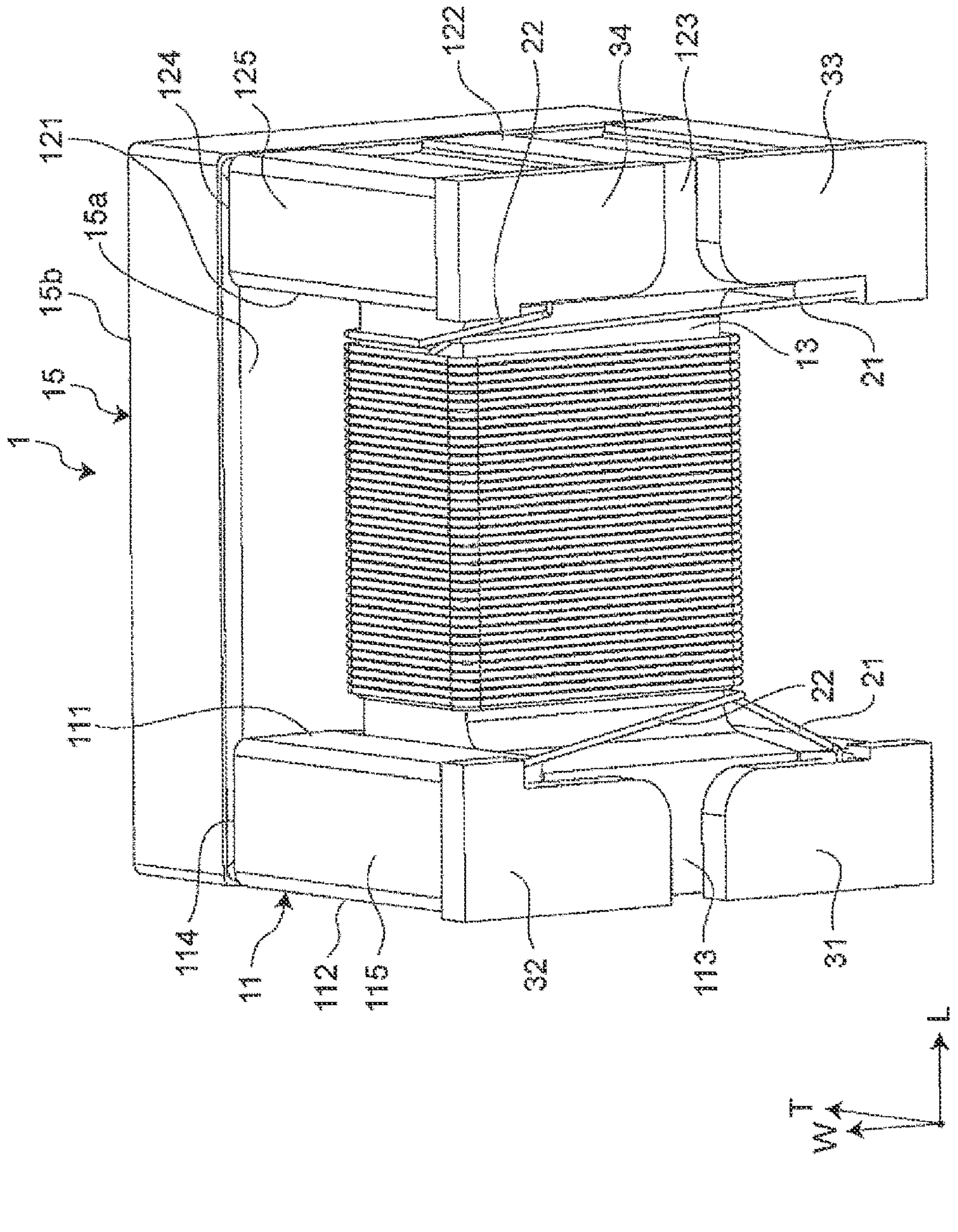
FIG. 2 is a perspective view of the coil component according to the first embodiment as seen from below.

FIG. 1 is a perspective view of a coil component according to a first embodiment as seen from above. FIG. 2 is a perspective view of the coil component according to the first embodiment as seen from below. As illustrated in FIGS. 1 and 2, a coil component 1 includes a core 10, a first wire 21 and a second wire 22 wound around the core 10, a first electrode portion 31, a second electrode portion 32, a third electrode portion 33, and a fourth electrode portion 34 that are provided in the core 10 and to which the first wire 21 and the second wire 22 are electrically connected, and a magnetic plate 15 attached to the core 10.

The core 10 includes a winding core portion 13, a first flange portion 11, and a second flange portion 12. The winding core portion 13 has a shape extending in a certain direction and around which the coil 20 is wound. The first flange portion 11 is provided at a first end in a direction in which the winding core portion 13 extends, and protrudes in a direction orthogonal to the direction in which the winding core portion 13 extends. The second flange portion 12 is provided at a second end in the direction in which the winding core portion 13 extends, and protrudes in the direction orthogonal to the direction in which the winding core portion 13 extends. The direction in which the winding core portion 13 extends is also referred to as the axial direction of the winding core portion 13. The material of the core 10 is preferably, for example, a magnetic material such as a ferrite sintered body or a molded body of magnetic powder containing resin, but the material may be a non-magnetic material such as alumina or resin.

In the following description, the bottom surface of the core 10 is assumed to be the surface to be mounted on the mounting board and the surface on the opposite side of the bottom surface of the core 10 is assumed to be the upper surface of the core 10. The axial direction of the winding core portion 13 is assumed to be the L direction, the direction orthogonal to the L direction on the bottom surface of the core 10 is assumed to be the W direction, and the direction in which the bottom surface of the core 10 faces the upper surface is assumed to be the T direction. The T direction is orthogonal to the L direction and the W direction. The positive direction of the T direction is assumed to be upward and the negative direction of the T direction is assumed to be downward. That is, the bottom surface of the core 10 corresponds to downward in the vertical direction and the upper surface of the core 10 corresponds to upward in the vertical direction.

The first flange portion 11 has an inner end surface 111 facing the winding core portion 13, an outer end surface 112 facing the opposite side of the inner end surface 111, a bottom surface 113 that couples the inner end surface 111 and the outer end surface 112 to each other and faces a mounting board when mounted, an upper surface 114 facing the opposite side of the bottom surface 113, and two side surfaces 115 that couple the inner end surface 111 and the outer end surface 112 to each other and couple the bottom surface 113 and the upper surface 114 to each other. Similarly, the second flange portion 12 has an inner end surface 121 facing the winding core portion 13, an outer end surface 122 facing the opposite side of the inner end surface 121, a bottom surface 123 facing the mounting board when mounted, an upper surface 124 facing the opposite side of the bottom surface 123, and two side surfaces 125 that couple the inner end surface 121 and the outer end surface 122 to each other and couple the bottom surface 123 and the upper surface 124 to each other.

The magnetic plate 15 is fixed to the pair of the first flange portion 11 and the second flange portion 12 so as to straddle the pair of them. The magnetic plate 15 is attached to the upper surface 114 of the first flange portions 11 and the upper surface 124 of the second flange portions 12 with an adhesive. The material of the magnetic plate 15 is the same as that of, for example, the core 10. Since both the core 10 and the magnetic plate 15 are made of magnetic materials, they form a closed magnetic path and improve the obtainment efficiency of the inductance value.

The first flange portion 11 has two foot portions on the bottom surface 113 thereof. One foot portion is provided with the first electrode portion 31 and the other foot portion is provided with the second electrode portion 32. The second flange portion 12 has two foot portions on the bottom surface 123 thereof. One foot portion on the same side as the foot portion having the first electrode portion 31 is provided with the third electrode portion 33 and the other foot portion on the same side as the foot portion having the second electrode portion 32 is provided with the fourth electrode portion 34. As illustrated in FIGS. 1 and 2, the bottom surface 113 and the bottom surface 123 refer to the portions including the bottom surface portions of the crotch portions from the bottom portions of the foot portions through the side surface portions of the crotch portions between the foot portions.

The first wire 21 and the second wire 22 are conductive wires with insulating coating in which conducting wires made of a metal such as, for example, copper are covered with coatings made of a resin such as polyurethane or polyamide-imide. The first wire 21 has one end electrically connected to the first electrode portion 31 and the other end electrically connected to the third electrode portion 33. The second wire 22 has one end electrically connected to the second electrode portion 32 and the other end electrically connected to the fourth electrode portion 34. The first wire 21 and the second wire 22 are connected to the first electrode portion 31 to the fourth electrode portion 34 via, for example, thermo pressure bonding, brazing, welding, or the like.

The first wire 21 and the second wire 22 are wound in the same direction around the winding core portion 13. Accordingly, when signals with opposite phases such as differential signals are input to the first wire 21 and the second wire 22 in the coil component 1, the magnetic fluxes generated by the first wire 21 and the second wire 22 cancel each other, the function as a inductor is weakened, and the signals are passed. In contrast, when signals with the same phase such as external noise are input to the first wire 21 and the second wire 22, the magnetic fluxes generated by the first wire 21 and the second wire 22 strengthen each other, the function as an inductor is strengthened, and passing of the noise is blocked. Accordingly, the coil component 1 functions as a common mode choke coil that attenuates common mode signals such as external noise while reducing the passing loss of differential mode signals such as differential signals.

When the coil component 1 is mounted on the mounting board, the bottom surface 113 of the first flange portion 11 and the bottom surface 123 of the second flange portion 12 face the mounting board. At this time, the axial direction of the winding core portion 13 and the main surface of the mounting board are parallel to each other. That is, the coil component 1 is of a horizontal winding type in which the winding axes of the first wire 21 and the second wire 22 are parallel to the mounting board.

Figure 3A:
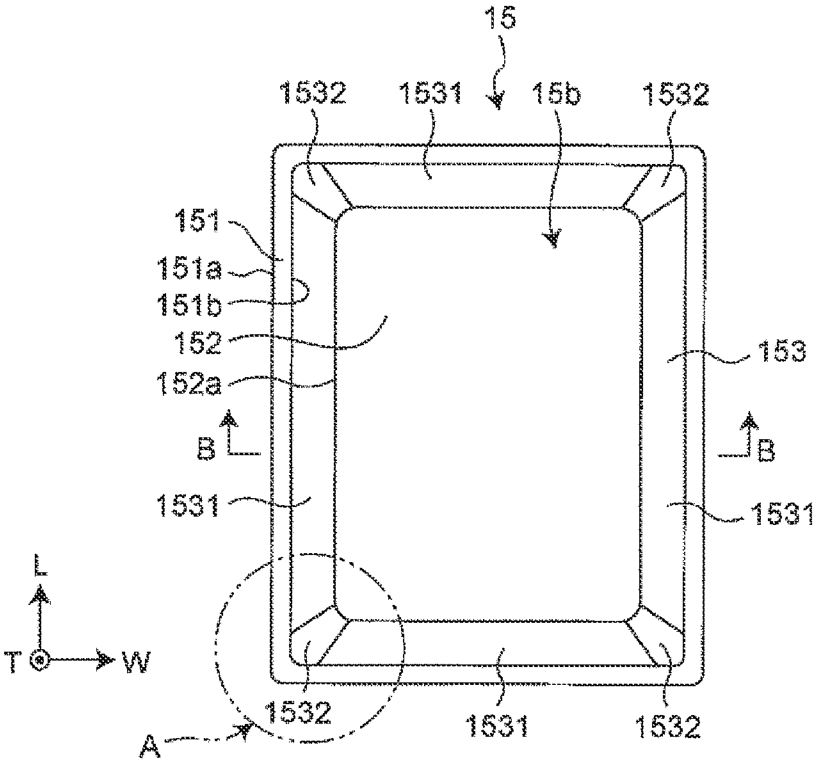
FIG. 3A is a plan view of a magnetic plate of the coil component.
Figure 3B:
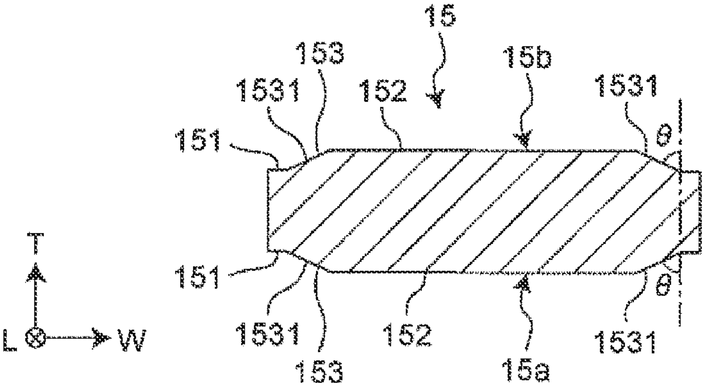
FIG. 3B is a sectional view taken along line B-B in FIG. 3A.
Figure 4:
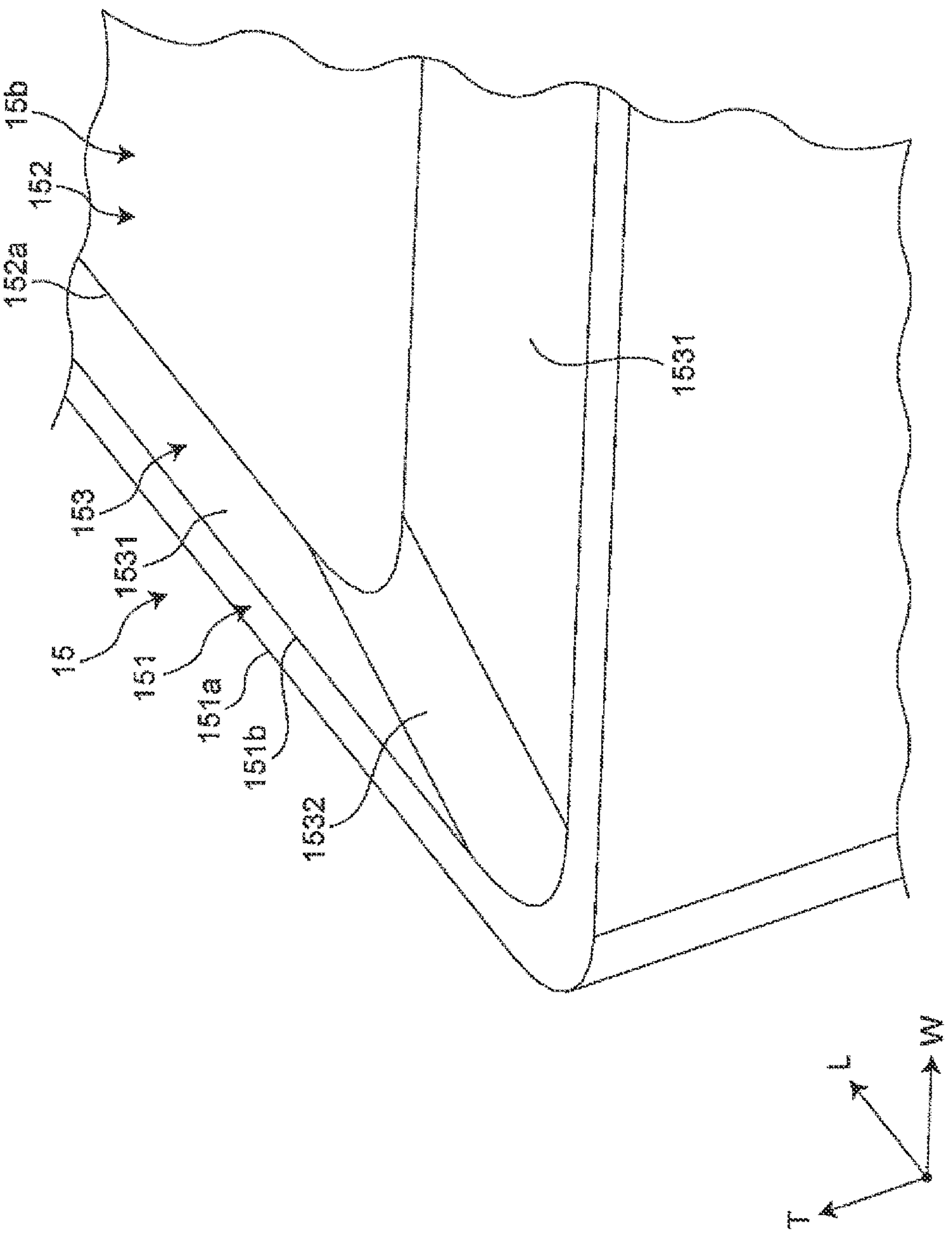
FIG. 4 is an enlarged perspective view of part A in FIG. 3A.

FIG. 3A is a plan view of the magnetic plate 15 and FIG. 3B is a sectional view taken along line B-B in FIG. 3A. FIG. 4 is an enlarged perspective view of part A in FIG. 3A.

As illustrated in FIGS. 3A, 3B, and 4, the magnetic plate 15 has a first main surface 15*a* facing the core 10 and a second main surface 15*b* on the opposite side of the first main surface 15*a*. The first main surface 15*a* and the second main surface 15*b* are the widest surfaces among the outer surfaces of the magnetic plate 15.

On the second main surface 15*b* of the magnetic plate 15, the magnetic plate 15 includes an annular first planar portion 151, a second planar portion 152, and a connection surface portion 153. The first planar portion 151 has an outer circumference 151*a* and an inner circumference 151*b*. The second planar portion 152 is located inside the inner circumference 151*b* of the first planar portion 151 as seen in the direction orthogonal to the first planar portion 151, and has a step between the first planar portion 151 and the second planar portion 152. The connection surface portion 153 connects the inner circumference 151*b* of the first planar portion 151 and an outer circumference 152*a* of the second planar portion 152 to each other. Similarly, on the first main surface 15*a* of the magnetic plate 15, the magnetic plate 15 has the first planar portion 151, the second planar portion 152, and the connection surface portion 153. The first planar portion 151, the second planar portion 152, and the connection surface portion 153 provided on the first main surface 15*a* coincide with the first planar portion 151, the second planar portion 152, and the connection surface portion 153 provided on the second main surface 15*b* as seen in the T direction.

The connection surface portion 153 is configured by annularly disposing four slopes 1531 inclined with respect to the direction orthogonal to the first planar portion 151. The slopes 1531 are inclined so as to fall toward the center of the magnetic plate 15 as the slopes 1531 approach the second planar portion 152 from the first planar portion 151.

The connection surface portion 153 has a chamfered portion 1532 between adjacent slopes 1531. The chamfered portion 1532 is a convex curved surface in this embodiment. It should be noted that the chamfered portion 1532 may be, for example, a concave curved surface or a C plane. In other words, the chamfered portion 1532 has no ridge line or has a plurality of ridge lines, and the chamfered portion 1532 does not consist of one ridge line, that is, the chamfered portion 1532 is not a side.

Specifically, the inner circumference 151*b* of the first planar portion 151 and the outer circumference 152*a* of the second planar portion 152 are substantially polygonal. The corner portions of the inner circumference 151*b* of the first planar portion 151 and the corner portions of the outer circumference 152*a* of the second planar portion 152 are disposed so as to face each other. The chamfered portions 1532 of the connection surface portion 153 are located between the corner portions of the inner circumference 151*b* of the first planar portion 151 and the corner portions of the outer circumference 152*a* of the second planar portion 152.

With this, since the connection surface portion 153 has the chamfered portion 1532 between adjacent slopes 1531, cracks and chips in the connection surface portion 153 can be suppressed. In addition, since the connection surface portion 153 is configured by annularly disposing the four slopes 1531 inclined with respect to the direction orthogonal to the first planar portion 151, the connection surface portion 153 is inclined with respect to the direction orthogonal to the first planar portion 151. Accordingly, when the magnetic plate 15 is formed with a mold, the mold is easily filled with the material of the magnetic plate 15 and the magnetic plate 15 is easily removed from the mold, thereby reducing occurrence of defects in the magnetic plate 15. Accordingly, the quality of the coil component 1 can be ensured.

In contrast, in a known coil component, the connection surface portion does not have a chamfered portion between adjacent slopes. That is, one ridge line (side) is provided between adjacent slopes. Accordingly, another member is caught in a ridge line of the connection surface portion and cracks and chips are easily generated in the ridge line of the connection surface portion. In addition, the slopes of the connection surface portion are parallel to the direction orthogonal to the first planar portion. Therefore, when the magnetic plate is molded with a mold, the mold is not easily filled with the material of the magnetic plate and the magnetic plate cannot be easily removed from the mold, thereby causing defects to easily occur in the magnetic plate. Accordingly, the quality of the coil component degrades.

In the first embodiment, the first planar portion 151, the second planar portion 152, and the connection surface portion 153 are provided on each of the first main surface 15*a* and the second main surface 15*b*. With this, it is not necessary to distinguish between the first main surface 15*a* and the second main surface 15*b* of the magnetic plate 15, so the magnetic plate 15 can be easily attached to the flange portions 11 and 12 of the core 10.

It should be noted that the first planar portion 151, the second planar portion 152, and the connection surface portion 153 may be provided on the first main surface 15*a* among the first main surface 15*a* and the second main surface 15*b*. With this, the magnetic plate 15 can be manufactured with less machining.

In the first embodiment, the second planar portion 152 is present at a position higher than the first planar portion 151. Being present at a position higher than the first planar portion 151 means being present at a position farther from the center of the magnetic plate 15 than the first planar portion 151 in the direction orthogonal to the first planar portion 151. Specifically, on the first main surface 15*a*, the second planar portion 152 is located below the first planar portion 151. On the second main surface 15*b*, the second planar portion 152 is located above the first planar portion 151.

With this, when the magnetic plate 15 is attached to the core 10 with the second planar portion 152 of the magnetic plate 15 in contact with the flange portions 11 and 12 of the core 10, the magnetic efficiency can be controlled by control of the adhesion of the magnetic plate 15 to the core 10. In addition, since a convex portion that projects from the first planar portion 151 is formed by the second planar portion 152 and the connection surface portion 153, the thickness of the magnetic plate 15 can be increased to improve the strength of the magnetic plate 15.

In the first embodiment, the outer circumference 151*a* of the first planar portion 151 has a rectangular shape. The rectangular shape includes not only a rectangular shape with sharp corners, but also substantially a rectangular shape with substantially R-shaped corners. With this, the magnetic plate 15 can correspond to the shapes of the flange portions 11 and 12 of the core 10 to improve the magnetic efficiency. Preferably, the corners of the outer circumference 151*a* of the first planar portion 151 are substantially R-shaped. With this, cracks and chips at corners of the outer circumference 151*a* of the first planar portion 151 can be suppressed.

Similarly, the outer circumference 152*a* of the second planar portion 152 has a rectangular shape. With this, the magnetic plate 15 can correspond to the shapes of the flange portions 11 and 12 of the core 10 to improve the magnetic efficiency. Preferably, the corners of the outer circumference 152*a* of the second planar portion 152 are substantially R-shaped. With this, cracks and chips at corners of the outer circumference 152*a* of the second planar portion 152 can be suppressed.

In the first embodiment, the first planar portion 151 and the second planar portion 152 have flat shapes. Preferably, the first planar portion 151 is parallel to the LW plane and the second planar portion 152 is parallel to the first planar portion 151. That is, the direction orthogonal to the first planar portion 151 coincides with the T direction. With this, since the second planar portion 152 has a flat shape, when the magnetic plate 15 is attached to the core 10 with the second planar portion 152 of the magnetic plate 15 in contact with the flange portions 11 and 12 of the core 10, the magnetic efficiency can be controlled by control of the adhesion of the magnetic plate 15 to the core 10. When the upper surface 114 of the first flange portion 11 and the upper surface 124 of the second flange portion 12 have flat shapes, the contact area between the magnetic plate 15 and the core 10 becomes large.

In the first embodiment, the inclination angle θ (see FIG. 3B) of the slopes 1531 with respect to the direction orthogonal to the first planar portion 151 is not less than approximately 20°. With this, cracks and chips in the connection surface portion 153 can be further suppressed and occurrence of defects in the magnetic plate 15 can be further suppressed. The inclination angle θ is preferably not less than approximately 50°, more preferably approximately 75°. Accordingly, cracks and chips in the connection surface portion 153 can be further suppressed and occurrence of defects in the magnetic plate 15 can be further suppressed.

Figure 5:
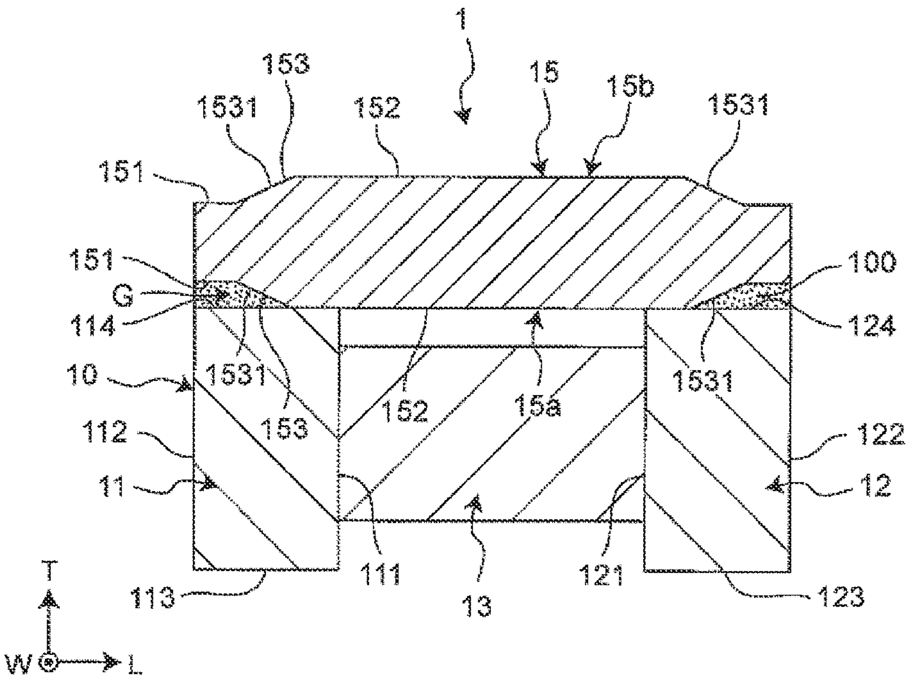
FIG. 5 is a sectional view of the coil component taken in a TL plane.
Figure 6:
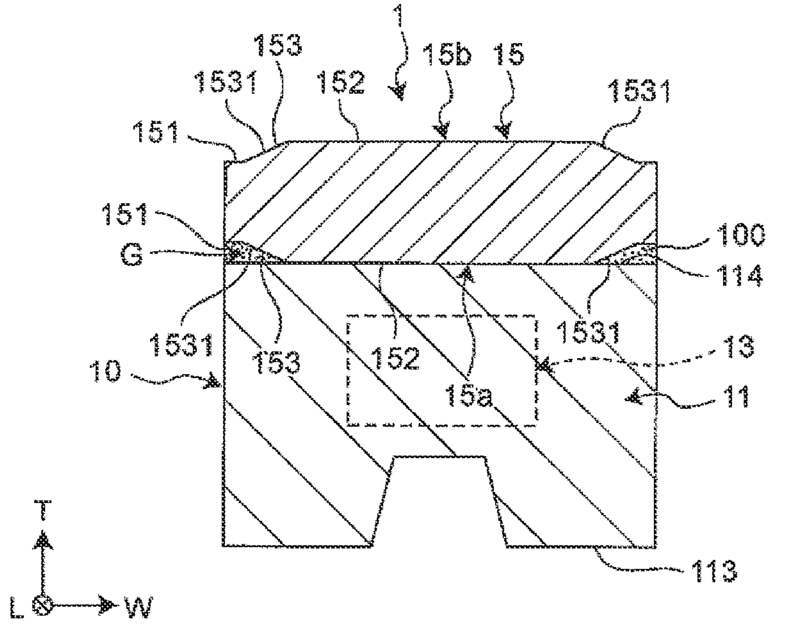
FIG. 6 is a sectional view of the coil component taken in a TW plane.
Figure 7:
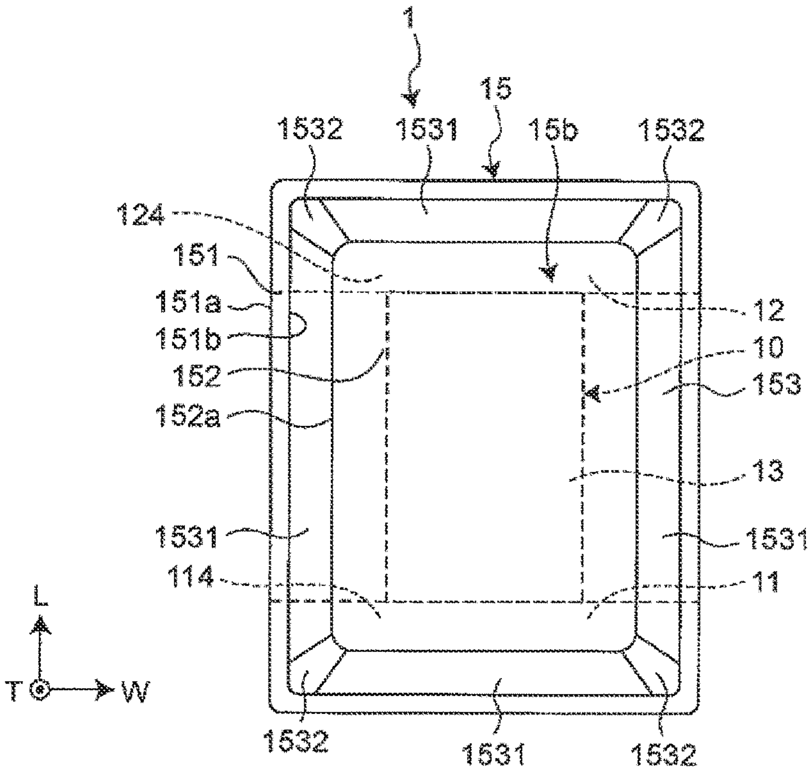
FIG. 7 is a plan view of the coil component as seen in a T direction.

FIG. 5 is a sectional view of the coil component 1 taken in a TL plane. FIG. 6 is a sectional view of the coil component 1 taken in a TW plane. FIG. 7 is a plan view of the coil component 1 as seen in a T direction. In FIGS. 5, 6, and 7, the wires 21 and 22 and the electrode portions 31 to 34 are not illustrated for convenience.

As illustrated in FIGS. 5, 6, and 7, a part of the second planar portion 152 of the magnetic plate 15 overlaps with parts of the flange portions 11 and 12 as seen in the direction (T direction) orthogonal to the first planar portion 151 of the magnetic plate 15. A part of the second planar portion 152 is in contact with parts of the flange portions 11 and 12. Specifically, a part of the second planar portion 152 of the first main surface 15*a* is in contact with the upper surface 114 of the first flange portion 11 and in contact with the upper surface 124 of the second flange portion 12. With this, the magnetic plate 15 can be attached to the core 10 with the second planar portion 152 of the magnetic plate 15 in contact with the flange portions 11 and 12 of the core 10.

In the first embodiment, the winding core portion 13 is surrounded by the outer circumference 152*a* of the second planar portion 152 of the first main surface 15*a* as seen in the direction (T direction) orthogonal to the first planar portion 151. That is, the winding core portion 13 is located inside the outer circumference 152*a* of the second planar portion 152 as seen in the direction orthogonal to the first planar portion 151. With this, since the contact areas between the flange portions 11 and 12 and the second planar portion 152 can be increased, the fixing strength of the magnetic plate 15 to the core 10 can be improved and the magnetic efficiency can be improved. In addition, since the winding core portion 13 is surrounded by the outer circumference 152*a* of the second planar portion 152, the magnetic path length from the winding core portion 13 to the magnetic plate 15 can be reduced and the magnetic efficiency can be improved.

If the winding core portion 13 protrudes outside the outer circumference 152*a* of the second planar portion 152 as seen in the T direction, the contact areas between the flange portions 11 and 12 and the second planar portion 152 become smaller, the magnetic path length from the winding core portion 13 to the magnetic plate 15 increases, and the magnetic efficiency reduces.

In the first embodiment, grooves G partitioned by the first planar portion 151, the connection surface portion 153, and facing surfaces of the flange portions 11 and 12 that face the first planar portion 151 and the connection surface portion 153 are provided. Specifically, the groove G close to the first flange portion 11 is partitioned by the first planar portion 151 of the first main surface 15*a*, the connection surface portion 153 of the first main surface 15*a*, and the upper surface 114 of the first flange portion 11. The groove G close to the second flange portion 12 is partitioned by the first planar portion 151 of the first main surface 15*a*, the connection surface portion 153 of the first main surface 15*a*, and the upper surface 124 of the second flange portion 12. That is, each of the grooves G is a closed space that does not include the external space of the coil component 1.

At least a part of an adhesive 100 for bonding the magnetic plate 15 and the core 10 to each other is present in the grooves G. Preferably, all of the adhesive 100 is present in the grooves G and the adhesive 100 does not protrude to the external space of the coil component 1. With this, the grooves G can be used as adhesive reservoirs to suppress an increase in the outer shape of the coil component 1 due to the protrusion of the adhesive 100.

Second Embodiment

Figure 8:
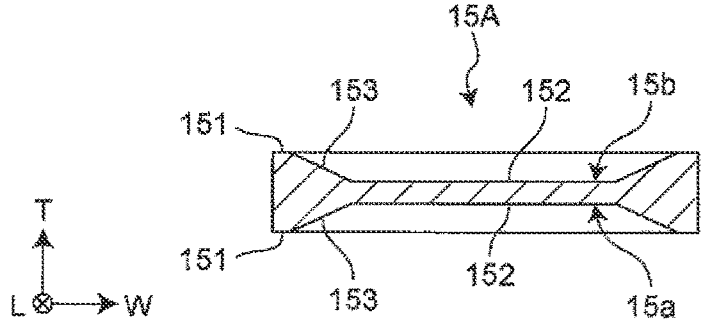
FIG. 8 is a sectional view of a magnetic plate of a coil component according to a second embodiment taken in the TW plane.

FIG. 8 is a sectional view of a magnetic plate of a coil component according to a second embodiment taken in the TW plane. The position of the second planar portion of the magnetic plate according to the second embodiment is different from that according to the first embodiment. This difference in the structure will be described below. The other structure is the same as in the first embodiment and will not be described.

As illustrated in FIG. 8, in a magnetic plate 15A of the coil component according to the second embodiment, the second planar portion 152 is present at a position lower than the first planar portion 151. Being present at a position lower than the first planar portion 151 means being present at a position closer to the center of the magnetic plate 15A than the first planar portion 151 in the direction orthogonal to the first planar portion 151. Specifically, on the first main surface 15*a*, the second planar portion 152 is located above the first planar portion 151. On the second main surface 15*b*, the second planar portion 152 is located below the first planar portion 151.

With this, when the magnetic plate 15A is attached to the core 10 with the second planar portion 152 of the magnetic plate 15A in contact with the flange portions 11 and 12 of the core 10, the magnetic efficiency can be controlled by control of the adhesion of the magnetic plate 15A to the core 10. In addition, since a concave portion recessed from the first planar portion 151 is formed by the second planar portion 152 and the connection surface portion 153, the core 10 can be inserted into the concave portion of the magnetic plate 15A to reduce the height of the coil component.

Third Embodiment

Figure 9:
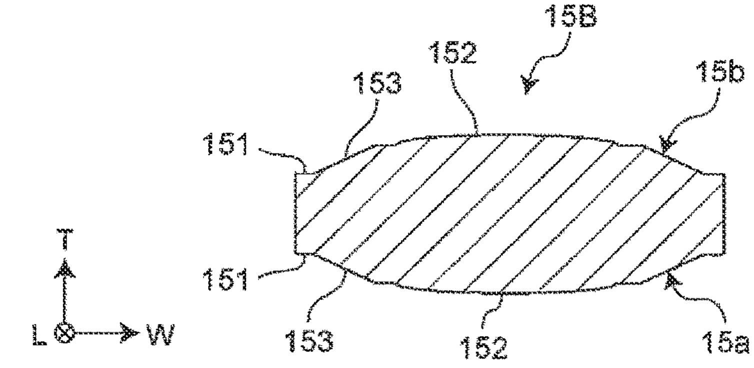
FIG. 9 is a sectional view of a magnetic plate of a coil component according to a third embodiment taken in the TW plane.

FIG. 9 is a sectional view of a magnetic plate of a coil component according to a third embodiment taken in the TW plane. The shape of the second planar portion of the magnetic plate according to the third embodiment is different from that according to the first embodiment. This difference in the structure will be described below. The other structure is the same as in the first embodiment and will not be described.

As illustrated in FIG. 9, in a magnetic plate 15B of the coil component according to the third embodiment, the shape of the second planar portion 152 includes a convex shape. The convex shape is a shape that projects away from the center of the magnetic plate 15B in the direction orthogonal to the first planar portion 151. Specifically, on the first main surface 15*a*, the second planar portion 152 projects downward from the first planar portion 151. On the second main surface 15*b*, the second planar portion 152 projects upward from the first planar portion 151. The shape of the second planar portion 152 includes a convex curved surface and forms substantially an arc in the TW cross section. It should be noted that the shape of the second planar portion 152 may be entirely convex or may partially include a flat shape.

With this, when the magnetic plate 15B is attached to the core 10 with the second planar portion 152 of the magnetic plate 15B in contact with the flange portions 11 and 12 of the core 10, the magnetic efficiency can be controlled by control of the adhesion of the magnetic plate 15B to the core 10. In addition, the thickness of the magnetic plate 15B can be increased to improve the strength of the magnetic plate 15B.

Fourth Embodiment

Figure 10:
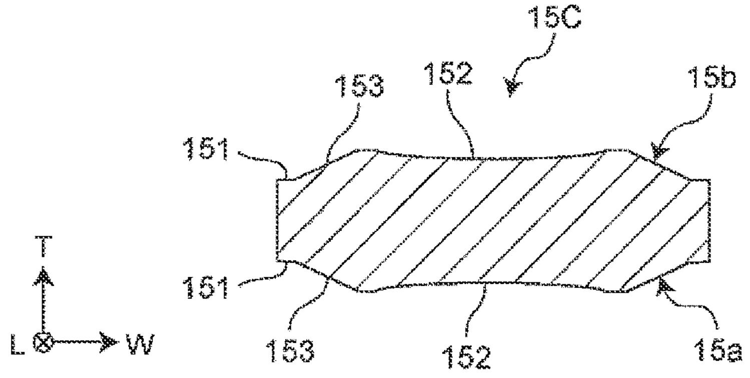
FIG. 10 is a sectional view of a magnetic plate of a coil component according to a fourth embodiment taken in the TW plane.

FIG. 10 is a sectional view of a magnetic plate of a coil component according to a fourth embodiment taken in the TW plane. The shape of the second planar portion of the magnetic plate according to the fourth embodiment is different from that according to the first embodiment. This difference in the structure will be described below. The other structure is the same as in the first embodiment and will not be described.

As illustrated in FIG. 10, in a magnetic plate 15C of the coil component according to the fourth embodiment, the shape of the second planar portion 152 includes a concave shape. The concave shape is a shape that is depressed so as to approach the center of the magnetic plate 15C in the direction orthogonal to the first planar portion 151. Specifically, on the first main surface 15*a*, the second planar portion 152 is depressed upward from the first planar portion 151. On the second main surface 15*b*, the second planar portion 152 is depressed downward from the first planar portion 151. The shape of the second planar portion 152 is a concave curved surface and forms substantially an arc in the TW cross section. It should be noted that the shape of the second planar portion 152 may be entirely concave or may partially include a flat shape.

With this, when the magnetic plate 15C is attached to the core 10 with the second planar portion 152 of the magnetic plate 15C in contact with the flange portions 11 and 12 of the core 10, the magnetic efficiency can be controlled by control of the adhesion of the magnetic plate 15C to the core 10. In addition, the core 10 can be inserted into the concave portion of the magnetic plate 15C to reduce the height of the coil component.

Fifth Embodiment

Figure 11:
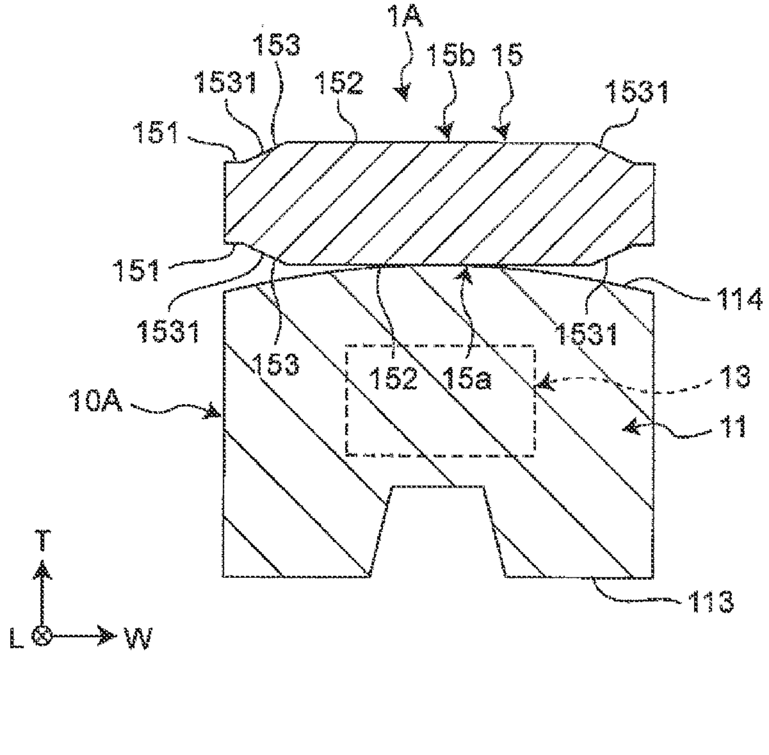
FIG. 11 is a sectional view of a coil component according to a fifth embodiment taken in the TW plane.

FIG. 11 is a sectional view of a coil component according to a fifth embodiment taken in the TW plane. The shape of the core according to the fifth embodiment is different from that according to the first embodiment. This difference in the structure will be described below. The other structure is the same as in the first embodiment and will not be described.

As illustrated in FIG. 11, in a core 10A of a coil component 1A according to the fifth embodiment, the portions of the flange portions 11 and 12 in contact with the second planar portion 152 have a convex shape that projects toward the second planar portion 152. Specifically, the upper surface 114 of the first flange portion 11 and the upper surface 124 of the second flange portion 12 are in contact with the second planar portion 152 of the first main surface 15*a* of the magnetic plate 15. The shape of the upper surfaces 114 and 124 includes a convex curved surface and forms substantially an arc in the TW cross section. It should be noted that the shape of the upper surfaces 114 and 124 may be entirely convex or may partially include a flat shape.

With this, the magnetic efficiency can be controlled by control of the adhesion of the magnetic plate 15 to the core 10A.

It should be noted that the present disclosure is not limited to the embodiments described above and design changes can be made without departing from the concept of the present disclosure. For example, the features of the first to fifth embodiments may be combined variously.

In the embodiments described above, the connection surface portion is configured by annularly disposing four slopes, but the connection surface portion may be configured by annularly disposing at least three slopes.

In the embodiments described above, the outer circumference of the first planar portion and the outer circumference of the second planar portion have rectangular shapes, but these outer circumferences may have substantially polygonal shapes other than rectangular shapes.

The coil component has two wires in the embodiments described above, but the coil component may have one wire or not less than three wires. In addition, the coil component is used as a common mode choke coil in the embodiments, but the coil component may be used as a winding coil such as, for example, a transformer or a coupled inductor in which a wire is wound around a winding core portion.

In the embodiments described above, the shape of the upper surface of the flange portion of the core may be any of a convex shape, a flat shape, or a concave shape and the shape of the second planar portion of the magnetic plate as the magnetic plate combined with this core may be any of a convex shape, a flat shape, or a concave shape.

EXAMPLES

As examples of the coil component according to the present disclosure, the relationship between the shape of the second planar portion of the first main surface of the magnetic plate and the inductance value of the coil component will be described.

The second planar portion of the first main surface of the magnetic plate has a flat shape as illustrated in FIG. 3B in a first example, the second planar portion of the first main surface of the magnetic plate has a convex shape as illustrated in FIG. 9 in a second example, and the second planar portion of the first main surface of the magnetic plate has a concave shape as illustrated in FIG. 10 in a third example. In any of the first to third examples, the upper surface of the flange portion of the core has a flat shape as illustrated in FIG. 6.

Figure 12:
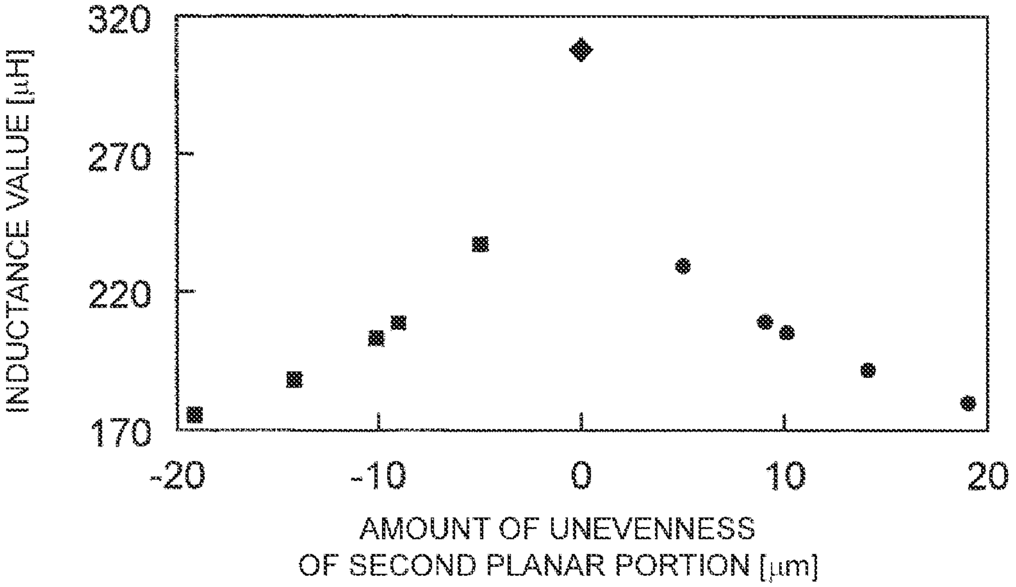
FIG. 12 is a graph illustrating the results of the simulation described herein.

Then, the amount of projection of the convex shape of the second planar portion in the second example was changed variously and the amount of depression of the concave shape of the second planar portion in the third example was changed variously. At this time, the inductance values in the first to third examples were obtained by simulation. FIG. 12 illustrates the results of the simulation described above.

In FIG. 12, the horizontal axis represents the amount (μm) of unevenness of the second planar portion and the vertical axis represents the inductance value (μH) of the coil component. The amount of unevenness will be specifically described below. The amount of unevenness when the second planar portion has a flat shape is assumed to be 0 μm (diamond mark in FIG. 12), the positive value is larger as the amount of projection of the convex shape of the second planar portion is larger (circle mark in FIG. 12), and the absolute value of the negative value is larger as the amount of depression of the concave shape of the second planar portion is larger (square mark in FIG. 12).

As can be seen from FIG. 12, the inductance value of the coil component can be changed by controlling the amount of unevenness in the second planar portion.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a core including a winding core portion and a pair of flange portions, configured such that one of the flange portions is provided on one end of the winding core portion and an other of the flange portions is provided on an other end of the winding core portion;

electrode portions provided in the pair of flange portions, respectively;

a wire wound around the winding core portion, both ends of the wire being electrically connected to the electrode portions; and a magnetic plate fixed to the pair of flange portions so as to straddle the pair of flange portions, wherein the magnetic plate includes an annular first planar portion, a second planar portion that is located inside an inner circumference of the first planar portion as seen in a direction orthogonal to the first planar portion and has a step between the first planar portion and the second planar portion, and a connection surface portion that connects the inner circumference of the first planar portion and an outer circumference of the second planar portion to each other, the connection surface portion is configured by annularly disposing at least three slopes inclined with respect to the direction orthogonal to the first planar portion, and the connection surface portion has chamfered portions each being disposed between adjacent slopes of the at least three slopes.

2. The coil component according to claim 1, wherein the magnetic plate has a first main surface facing the core, and a second main surface disposed on an opposite side of the first main surface, and the first planar portion, the second planar portion, and the connection surface portion are provided on each of the first main surface and the second main surface.

3. The coil component according to claim 1, wherein the magnetic plate has a first main surface facing the core, and a second main surface disposed on an opposite side of the first main surface, and the first planar portion, the second planar portion, and the connection surface portion are provided on the first main surface among the first main surface and the second main surface.

4. The coil component according to claim 1, wherein the second planar portion is at a position higher than the first planar portion.

5. The coil component according to claim 1, wherein the second planar portion is at a position lower than the first planar portion.

6. The coil component according to claim 1, wherein an outer circumference of the first planar portion has a rectangular shape.

7. The coil component according to claim 6, wherein a corner of the outer circumference of the first planar portion has an R-shape.

8. The coil component according to claim 1, wherein the outer circumference of the second planar portion has a rectangular shape.

9. The coil component according to claim 8, wherein
a corner of the outer circumference of the second planar portion has an R-shape.

10. The coil component according to claim 1, wherein
a shape of the second planar portion includes a convex shape.

11. The coil component according to claim 1, wherein
the second planar portion has a flat shape.

12. The coil component according to claim 1, wherein
a shape of the second planar portion includes a concave shape.

13. The coil component according to claim 1, wherein
an inclination angle of the slopes with respect to the direction orthogonal to the first planar portion is not less than 20°.

14. The coil component according to claim 13, wherein
the inclination angle is not less than 50°.

15. The coil component according to claim 1, wherein
a part of the second planar portion of the magnetic plate overlaps with a part of the flange portions as seen in the direction orthogonal to the first planar portion of the magnetic plate, and
a part of the second planar portion is in contact with a part of the flange portions.

16. The coil component according to claim 15, wherein
the winding core portion is surrounded by the outer circumference of the second planar portion as seen in the direction orthogonal to the first planar portion.

17. The coil component according to claim 15, wherein
the coil component has a groove partitioned by the first planar portion, the connection surface portion, and a facing surface of one of the flange portions, the facing surface facing the first planar portion and the connection surface portion, and
at least a part of an adhesive for bonding the magnetic plate and the core to each other is present in the groove.

18. The coil component according to claim 15, wherein
a portion of at least one of the flange portions in contact with the second planar portion has a convex shape that projects toward the second planar portion.

19. The coil component according to claim 2, wherein
the second planar portion is at a position higher than the first planar portion.

20. The coil component according to claim 2, wherein
the second planar portion is at a position lower than the first planar portion.

* * * * *